United States Patent [19]

Rao et al.

[11] 4,166,888

[45] Sep. 4, 1979

[54] CELL HAVING AN ALKALI METAL ANODE, A FLUORINATED CARBON CATHODE AND AN ELECTROLYTE WHICH INCLUDES AN ALKALI METAL HALIDE SALT AND A SOLVENT SYSTEM CONTAINING A SUBSTITUTED AMIDE SOLVENT AND A CYCLIC CARBONATE COSOLVENT

[75] Inventors: Baskara M. L. Rao, Fanwood; Paul A. Malachesky, Berkeley Heights, both of N.J.

[73] Assignee: Exxon Research & Engineering Co., Florham Park, N.J.

[21] Appl. No.: 955,646

[22] Filed: Oct. 30, 1978

[51] Int. Cl.$^2$ ............................................. H01M 6/14
[52] U.S. Cl. ................................. 429/194; 429/199; 429/218
[58] Field of Search ............... 429/199, 194, 188, 197, 429/101, 103, 218, 198

[56] References Cited

U.S. PATENT DOCUMENTS

| | | | |
|---|---|---|---|
| 3,514,337 | 5/1970 | Braeuer et al. | 429/194 |
| 3,536,532 | 10/1970 | Watanabe et al. | 429/194 |
| 3,907,593 | 9/1975 | Marincic | 429/196 |
| 3,922,174 | 11/1975 | Heller | 429/218 X |
| 4,105,836 | 8/1978 | Almerini | 429/194 |

*Primary Examiner*—Anthony Skapars
*Attorney, Agent, or Firm*—Kenneth P. Glynn

[57] ABSTRACT

A novel electrochemical cell is disclosed utilizing an alkali metal anode, a fluorinated carbon cathode, and an electrolyte which includes an alkali metal halide salt and a mixed solvent system containing a substituted amide and a cyclic carbonate. Preferred are the cells wherein the anode is lithium, the cathode is $C_2F$, and the electrolyte contains essentially of LiCl and a solvent system of N,N-dimethylacetamide and propylene carbonate, optionally with an ether.

29 Claims, 1 Drawing Figure

COMPARISON OF LiCl vs. LiClO$_4$ ELECTROLYTES
AT A 10 K OHM LOAD

COMPARISON OF LiCl vs. LiClO$_4$ ELECTROLYTES AT A 10K OHM LOAD

CELL HAVING AN ALKALI METAL ANODE, A FLUORINATED CARBON CATHODE AND AN ELECTROLYTE WHICH INCLUDES AN ALKALI METAL HALIDE SALT AND A SOLVENT SYSTEM CONTAINING A SUBSTITUTED AMIDE SOLVENT AND A CYCLIC CARBONATE COSOLVENT

BACKGROUND OF THE INVENTION

1. Field of the Invention

This invention relates to a novel electric current-producing cell. More particularly, this invention relates to improvements in the electric current producing cells of the type comprising an alkali metal anode, a cathode of a fluorinated carbon material, and an electrolyte which includes an alkali metal halide salt and a mixed solvent system containing a substituted amide solvent and a cyclic carbonate cosolvent.

2. Description of the Prior Art

There has been considerable interest in recent years in developing high energy density electrochemical cell systems. Among the systems being investigated are those employing nonaqueous electrolytes including liquid and fused salt electrolytes, lithium anodes, and cathodes containing compounds of carbon, e.g., fluorinated carbon compounds. Typical systems are described, for example, in U.S. Pat. No. 3,536,522 and U.S. Pat. No. 3,514,337.

Additionally, various efforts have been made to develop solid state electrolytes for high energy density electrochemical cell systems. Alkali metal-aluminum-halogen compounds have been utilized in liquid and molten state electrolyte systems (e.g., as described in U.S. Pat. No. 3,877,984 and U.S. Pat. No. 3,751,298), and solid alkali metal-aluminum-halogen compound conductivity studies have been made (e.g., N. I. Anufrieva et al., *Tsuet. Metal.*, Vol. 1, pp. 32-36 (1973); W. Weppner et al., *Physics Letters*, Vol. 58A, No. 4, pp. 245-248 (1976); and J. Schoonman et al., *J. Solid Chem.*, Vol. 16, pp. 413-422 (1976)). Additionally, certain solvent complexed alkali metal salts have been described as useful solid electrolytes (see U.S. Pat. Nos. 3,704,174 and 3,997,900, for example.) However, to date, there has been no suggestion that alkali metal halides may be employed as electrolyte salts in fluorinated carbon cathode cells as employed in the cells of the present invention.

SUMMARY OF THE INVENTION

A novel electric current-producing cell of the present invention has been developed which comprises: (a) an alkali metal anode; (b) a cathode comprised of fluorinated carbon; and (c) an electrolyte which includes an alkali metal halide salt and a mixed solvent system containing a substituted amide solvent and a cyclic carbonate cosolvent.

DETAILED DESCRIPTION OF THE INVENTION

Figure 1:
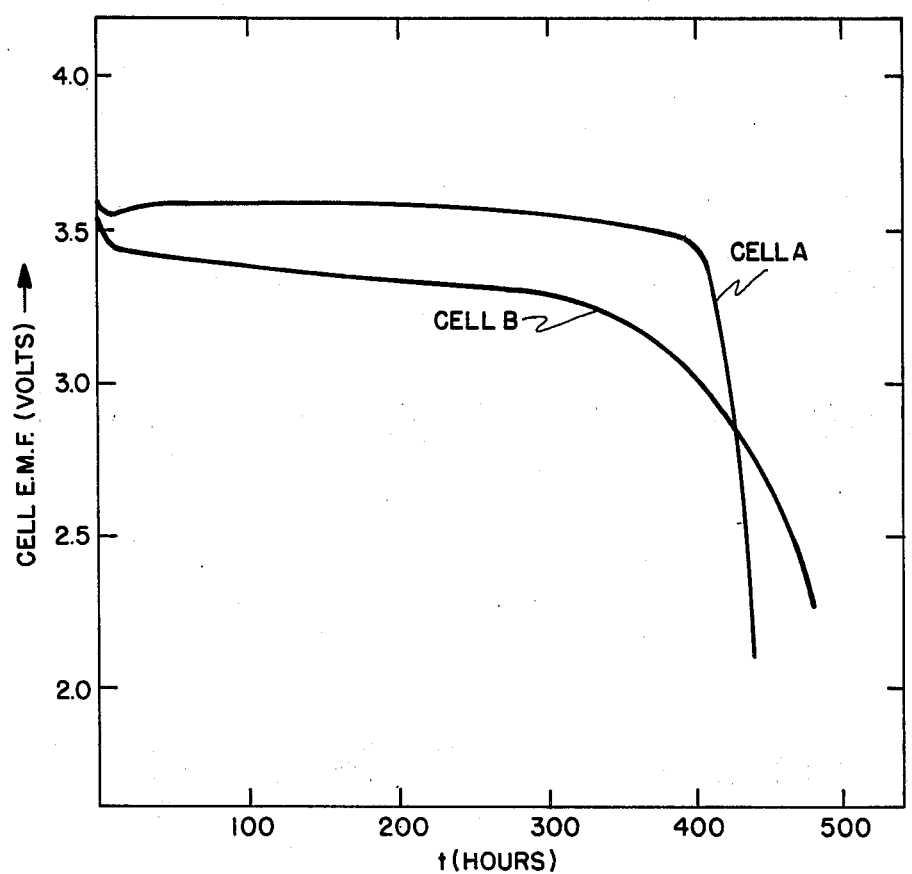
FIG. 1 shows the cell voltage-time behavior.

In the cell of the present invention, an anode is employed which contains an anode-active material selected from the alkali metals. Desirably, the anode is substantially sodium, potassium, lithium or alloys containing these, and preferably the anode is lithium metal, or a lithium metal alloy. The alkali metal, for example lithium, may be in contact with other metal structures such as nickel, copper or silver screen, which serve as current collectors and are well known in the art.

The cathode in the current-producing cell of the present invention is one which contains as its cathode-active material a compound of carbon and fluorine. Included are any of the well-known fluorinated carbon cathodes such as those prepared from any of the conductive carbons and especially the $(C_yF)_n$ types, where y represents the atomic ratio of carbon to fluorine, e.g., a small fraction to an integer less than 10, and n is the number of $(CF_y)$ units in the molecule, e.g., 1 to very large numbers. Among these, the $C_2F$ cathode is desirable in the cell of the present invention. Advantageously, the $C_2F$ type cathode may be one which is formed by reacting a crystalline form of carbon such as natural or pyrolytic graphite, with an interhalogen fluoride in the presence of hydrogen fluoride. These interhalogen fluorides include those selected from $ClF_3$, $ClF_5$, $BrF_3$, $BrF_5$, $ICl$ and $IF_5$, particularly $ClF_3$. However, the cathode-active material may be prepared by any known method such as treatment of carbon with fluorine gas at elevated temperatures or simply by suspending the carbon, such as graphite, in liquid hydrogen fluoride and thereafter adding an interhalogen compound for a time sufficient for it to react with the carbon compound.

The electrolyte employed in the novel cell of the one which includes an alkali metal halide salt and a mixed solvent system containing a substituted amide solvent and a cyclic carbonate cosolvent. The alkali metal halogen salt is one or more having the formula:

$$ZX \qquad (1)$$

wherein Z is an alkali metal and wherein X is a halogen selected from the group consisting of chlorine and fluorine. Desirably, the alkali metal Z in Formula (1) above is selected from lithium, sodium, and potassium. Preferred is lithium. The halogen X in Formula (1) is preferably chlorine. Among the specific alkali metal halide salts included are: LiCl; LiF; NaF; NaCl; KCl and the like. The most preferred compounds are LiCl and LiF, particularly LiCl.

The substituted amide solvent used in the electrolyte of the present invention is one or more substituted amides having the formula:

$$R_1CONR_2R_3 \qquad (2)$$

wherein $R_1$ is an alkyl radical having 1 to 3 carbon atoms, and wherein $R_2$ and $R_3$ may be the same or different and are alkyl radicals having 1 to 4 carbon atoms, and preferably $R_2$ and $R_3$ are alkyl radicals having 1 to 3 carbon atoms. Among the amide solvents included are N,N-dimethylacetamide (DMAA), N,N-dipropyacetamide (DPAA), N,N-methylpropylacetamide (DMPA) and the like. A preferred amide solvent is DMAA.

As mentioned, in addition to the alkali metal halide salt and the substituted amide solvent, the electrolyte of the cell of the present invention includes a cyclic carbonate solvent. This cosolvent may be any cyclic carbonate solvent which is compatible with the substituted amide solvent and which will act to protect the alkali metal anode from possible reaction with the substituted amide. This is believed to be accomplished by the passivation of the alkali metal anode, e.g., by the formation of a thin layer of a lithium compound resulting from interaction with the cosolvent. Among the cyclic carbonates which may be used are ethylene carbonate (EC) and propylene carbonate (PC), etc. Thus, the alkali metal anode may be passivated by the formation of an alkali metal carbonate, e.g., $Li_2CO_3$.

Additional cosolvents may also be employed with the cyclic carbonate, as desired. For example, an ether or other cosolvent may be used to reduce the viscosity of the electrolyte solution. Thus, solvents such as dimethoxyethane (DME), diglyme, and triglyme may be used.

In general, the electrolyte will contain about 20 to about 80 percent of the substituted amide solvent by volume based on the total mixed solvent system volume, and about 80 to about 20 percent by volume of all cosolvent, at least a part of which is the cyclic carbonate cosolvent, the remainder being any other cosolvent that may be included. Preferably, about 40 to about 60 percent by volume of the solvent system is substituted amide, remainder being all cosolvents. If additional cosolvent is utilized with the cyclic carbonate cosolvent then at least one-third of the cosolvent is cyclic carbonate cosolvent, and preferably at least half of the cosolvent is cyclic carbonate. In preferred embodiments, about 40 to about 60 percent by volume of the solvent system is substituted amide solvent, about 30 to 20 percent by volume is cyclic carbonate cosolvent, and about 30 to about 20 percent by volume is ether cosolvent.

The alkali metal halide salt used in the electrolyte is generally employed in any amount sufficient to render the cell operable. As a practical matter, the salt may be used in amounts of about 0.5M to about 2M, based on solubility and conductivity considerations, and preferably in amounts about 0.75M to about 1.2M.

There is no criticality to the order in which the various components of the electrolyte are combined except that it is desirable to include the alkali metal-protecting cosolvent in the electrolyte solution before it is brought into contact with alkali metal anode.

The hardware used to associate the anode, electrolyte and cathode with one another to form the cell as the present invention may be any which is known in the art and is a matter of design choice. For example, the cathode material could be pressed into the base of a button cell can, electrolyte added, and a cover containing the lithium anode sealed to the can by conventional and well-known techniques.

The present invention is more fully developed by the following examples. These examples are presented for purposes of illustration, and the invention should not be construed to be limited thereto.

EXAMPLE 1

A series of electrolytes were prepared by adding anhydrous LiCl to various solvent mixtures (prepared on a volume percent basis) using pure DMAA, PC, and DME solvents. The resulting electrolyte resistivities are shown in Table I.

TABLE I
RESISTIVITY DATA FOR EXAMPLE 1

| LiCl Concentration, M. | Solvent System | Resistivity Ohm cm |
|---|---|---|
| 2 | DMAA | 270 |
| 1.2 | 50v/o DMAA-50v/o PC | 230 |
| 1.2 | 50v/o DMAA-25v/o PC 25v/o DME | 200 |
| 0.75 | 50v/o DMAA-25v/o PC 25v/o DME | 240 |

EXAMPLE 2

A 1.2 molal solution of LiCl in a 50v/o DMAA-25%v/o PC-25v/o DME solvent was prepared in accordance with Example 1 and used in a $Li/C_2F$ cell (Cell A-1) as follows:

about 0.4 grams of an 85 weight percent, 10 weight percent Vulcan XC72 (a conductive carbon sold by Cabot Corporation of Boston, Mass.), 5 weight percent TFE was pressed into the bottom of a one-inch diameter tantalum can. A glass fiber disc (Gelman Type A/E, 18 mil, produced by Gelman Instrument Co. of Ann Arbor, Michigan) was placed on top of the cathode cake along with a layer of TFE-bonded glass fiber. The electrolyte was then added, followed by addition of a lid containing a 15 mil Li anode, and sealing the cell by the usual crimping methods. For comparison, another cell (Cell B-1) was fabricated in an identical manner, but using an electrolyte of 0.5M $LiClO_4$ in a 40v/o PC-60v/o DME solvent.

The two cells thus fabricated had open circuit voltages of 3.80V and gave the polarization data of Table II. This data shows nearly equivalent performance for the LiCl containing electrolyte compared to the $LiClO_4$ electrolyte.

TABLE II
POLARIZATION DATA FOR EXAMPLE 2

| Cell Current | Voltage of Cell A-1 | Voltage of Cell B-2 |
|---|---|---|
| 1 | 3.69 | 3.69 |
| 2 | 3.50 | 3.65 |
| 5 | 3.40 | 3.41 |
| 10 | 3.23 | 3.23 |
| 15 | 3.07 | 3.13 |
| 20 | 2.90 | 3.05 |

EXAMPLE 3

Two test cells were constructed as described in Example 2. One cell (Cell A) contained again the 1.2M LiCl electrolyte in the 50v/o DMAA-25v/o PC-25v/o DME mixed solvent. The other cell contained a 0.5M $LiClO_4$ electrolyte in the 40v/o PC-60v/o DME mixed solvent (Cell B).

Both cells were discharged through a constant 10 kilohm load at ambient temperature. FIG. 1 shows the cell voltage-time behavior. The LiCl-containing cell operated at $\sim 3.6V$ for most of its discharge, which was 0.25V higher than the $LiClO_4$-containing cell. 83% Cathode utilization was obtained for the LiCl cell, compared to 94% utilization for the $LiClO_4$-containing cell.

What is claimed is:

1. A current producing cell, comprising:
   (a) an anode containing alkali metal as its anode-active material;
   (b) a cathode containing as a cathode-active material a compound of fluorine and carbon; and,
   (c) an electrolyte containing:
      (i) a mixed solvent system containing about 20 to about 80 percent by volume, based on the total solvent volume, of one or more substituted amides having the formula:

wherein $R_1$ is an alkyl radical having 1 to 3 carbon atoms and wherein $R_2$ and $R_3$ may be the same or different and are alkyl radicals having 1 to 4 carbon atoms, and containing about 80 to about 20 percent by volume, based on the total solvent volume, of one or more cosolvents, at least a part of which is cyclic carbonate cosolvent; and, (ii) one or more alkali metal halide salts having the formula:

ZX wherein Z in an alkali metal and wherein X is a halogen selected from the group consisting of chlorine and fluorine.

2. The cell of claim 1 wherein the anode is substantially lithium, sodium, potassium, or alloys containing these, and wherein Z is selected from the group consisting of lithium, sodium and potassium.

3. The cell of claim 2 wherein X is chlorine.

4. The cell of claim 1 wherein the cathode is fluorinated crystalline carbon material.

5. The cell of claim 4 wherein the anode is substantially lithium, sodium, potassium, or alloys containing these, wherein Z is selected from the group consisting of lithium, sodium and potassium, and wherein $R_1$ is an alkyl radical having 1 to 3 carbon atoms and $R_2$ and $R_3$ may be the same or different and are alkyl radicals having 1 to 4 carbon atoms.

6. The cell of claim 5 wherein said cosolvent includes one or more ether cosolvents in addition to said cyclic carbonate cosolvent.

7. The cell of claim 6 wherein said alkali metal halide salt is LiCl.

8. The cell of claim 7 wherein the cathode is $C_2F$, wherein the anode is substantially lithium, or a lithium alloy.

9. The cell of claim 8 wherein said substituted amide is N,N-dimethylacetamide.

10. The cell of claim 9 wherein said cyclic carbonate is propylene carbonate.

11. An electric cell comprising:
(a) a lithium metal-containing anode;
(b) a cathode containing a cathode-active material formed by reacting graphite with chlorine trifluoride in the presence of HF; and,
(c) an electrolyte containing:
(i) a solvent system containing about 20 to about 80 percent by volume, based on the total solvent volume, of one or more substituted amides having the formula:

$R_1CONR_2R_3$ wherein $R_1$ is an alkyl radical having 1 to 3 carbon atoms and wherein $R_2$ and $R_3$ may be the same or different and are alkyl radicals having 1 to 4 carbon atoms, and containing about 80 to about 20 percent by volume, based on the total solvent volume, of one or more cosolvents, at least a part of which is cyclic carbonate cosolvent; and, (ii) one or more alkali metal halide salts having the formula:

ZX wherein Z is an alkali metal and wherein X is a halogen selected from the group consisting of chlorine and fluorine.

12. The cell of claim 11 wherein Z is selected from the group consisting of lithium, sodium, and potassium.

13. The cell of claim 12 wherein $R_1$ is an alkyl radical having 1 to 3 carbon atoms and $R_2$ and $R_3$ may be the same or different and are alkyl radicals having 1 to 4 carbon atoms.

14. The cell of claim 13 wherein X is chlorine.

15. The cell of claim 14 wherein said cosolvent includes one or more ether cosolvents in addition to said cyclic carbonate cosolvent.

16. The cell of claim 15 wherein said alkali metal halide salt is LiCl.

17. The cell of claim 16 wherein said substituted amide is N,N-dimethylacetamide.

18. The cell of claim 17 wherein said cyclic carbonate cosolvent is propylene carbonate.

19. The cell of claim 15 wherein about 40 to about 60 percent by volume of said solvent system is said substituted amide, about 30 to about 20 percent is said cyclic carbonate cosolvent and about 30 to about 20 percent is said ether cosolvent.

20. The cell of claim 19 wherein said substituted amide is N,N-dimethylacetamide wherein said cyclic carbonate is propylene carbonate, and wherein said ether is dimethoxyethane.

21. The cell of claim 11 wherein Z is lithium.

22. The cell of claim 21 wherein $R_1$ is an alkyl radical having 1 to 3 carbon atoms and $R_2$ and $R_3$ may be the same or different and are alkyl radicals having 1 to 4 carbon atoms.

23. The cell of claim 22 wherein X is chlorine.

24. The cell of claim 23 wherein said cosolvent includes one or more ether cosolvents in addition to said cyclic carbonate cosolvent.

25. The cell of claim 24 wherein said alkali metal halide salt is LiCl.

26. The cell of claim 25 wherein said substituted amide is N,N-dimethylacetamide.

27. The cell of claim 26 wherein said cyclic carbonate cosolvent is propylene carbonate.

28. The cell of claim 24 wherein about 40 to about 60 percent by volume of said solvent system is said substituted amide, about 30 to about 20 percent is said cyclic carbonate cosolvent and about 30 to about 20 percent is said ether cosolvent.

29. The cell of claim 27 wherein said substituted amide is N,N-dimethylacetamide wherein said cyclic carbonate is propylene carbonate, and wherein said ether is dimethoxyethane.

* * * * *